United States Patent
Delago et al.

(10) Patent No.: US 11,394,201 B2
(45) Date of Patent: Jul. 19, 2022

(54) REVERSE FLOW AUTOMATIC TRANSFER SWITCH

(71) Applicant: Cummins Power Generation IP, Inc., Minneapolis, MN (US)

(72) Inventors: Julie M. Delago, Afton, MN (US); Timothy R. Beaucage, Coon Rapids, MN (US); Dennis McDonald, Golden Valley, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 408 days.

(21) Appl. No.: 16/200,374

(22) Filed: Nov. 26, 2018

(65) Prior Publication Data
US 2020/0169086 A1  May 28, 2020

(51) Int. Cl.
*H02J 3/06* (2006.01)
*H01H 3/28* (2006.01)
*H02J 9/06* (2006.01)

(52) U.S. Cl.
CPC .............. *H02J 3/06* (2013.01); *H01H 3/28* (2013.01); *H02J 9/06* (2013.01); *H01H 2300/018* (2013.01); *H02J 9/068* (2020.01)

(58) Field of Classification Search
CPC ...... H02J 3/06; H02J 9/06; H02J 9/068; H02J 3/14; H02J 3/0073; H02J 3/38; H02J 3/007; H01H 3/28; H01H 2300/018; Y02B 70/3225; Y02B 70/30; Y04S 20/248; Y04S 20/222

See application file for complete search history.

(56) References Cited

U.S. PATENT DOCUMENTS

| | | | | |
|---|---|---|---|---|
| 9,413,195 B2* | 8/2016 | Luebke | .................... | H02J 3/14 |
| 9,537,291 B1* | 1/2017 | Wilding | ................... | G06F 1/26 |
| 9,846,467 B2* | 12/2017 | Gardner | .............. | H05K 7/1492 |
| 10,103,572 B2* | 10/2018 | Navarro | .................. | H02J 9/062 |
| 2004/0201282 A1* | 10/2004 | Kado | ....................... | H02J 3/38 |
| | | | | 307/64 |
| 2012/0181869 A1* | 7/2012 | Chapel | .................. | G06F 1/3287 |
| | | | | 307/64 |
| 2012/0242145 A1* | 9/2012 | Espeut, Jr. | .............. | H01H 9/26 |
| | | | | 307/23 |
| 2015/0234440 A1* | 8/2015 | Gardner | .............. | G06F 11/2015 |
| | | | | 713/300 |
| 2015/0244210 A1* | 8/2015 | Kolhatkar | ............... | H02M 5/42 |
| | | | | 307/23 |
| 2015/0263567 A1* | 9/2015 | Kolhatkar | ............... | H02J 9/062 |
| | | | | 307/23 |

(Continued)

OTHER PUBLICATIONS

International Search Report and Written Opinion issued in International Application No. PCT/US2019/062991 dated Feb. 7, 2020.

*Primary Examiner* — Jared Fureman
*Assistant Examiner* — Michael J Warmflash
(74) *Attorney, Agent, or Firm* — Foley & Lardner LLP

(57) ABSTRACT

Systems and apparatuses include an automatic transfer switch including a source pole coupled with a power source, a first load pole coupled with a first load, a second load pole coupled with a second load, a first switch selectively coupling the first load pole to the source pole, and a second switch selectively coupling the second load pole to the source pole.

19 Claims, 2 Drawing Sheets

(56) References Cited

U.S. PATENT DOCUMENTS

| | | | |
|---|---|---|---|
| 2015/0311752 A1* | 10/2015 | Luebke | H04B 3/54 |
| | | | 361/63 |
| 2016/0036216 A1* | 2/2016 | Colombi | H02J 9/062 |
| | | | 361/93.9 |
| 2016/0118847 A1* | 4/2016 | Colombi | H02J 9/061 |
| | | | 307/65 |
| 2016/0226235 A1* | 8/2016 | Lathrop | H02J 1/10 |
| 2017/0214273 A1* | 7/2017 | Kogo | H02J 3/005 |
| 2017/0317525 A1* | 11/2017 | Navarro | H02J 9/061 |

* cited by examiner

REVERSE FLOW AUTOMATIC TRANSFER SWITCH

TECHNICAL FIELD

The present disclosure relates to power couplings. More particularly, the present disclosure relates to systems and methods for connecting a power source to multiple loads.

BACKGROUND

Automatic transfer switches (ATSs) for consumer applications may be used, for example, to selectively couple a local load from a residential or commercial building to a utility power grid. Such devices may also be used to selectively couple a local load to a generator when a power outage has occurred. A typical ATS has two power source inputs and an output. A typical ATS is composed of multiple parts such as an actuator, solenoids and contactor cartridges. ATS designs have complicated constructions and numerous parts, particularly with respect to the actuator and solenoid subsystems.

SUMMARY

At least one embodiment relates to a method that includes coupling a source pole of an automatic transfer switch with a power source, coupling a first load pole with a first load, coupling a second load pole with a second load, selectively closing a first switch to couple the first load pole to the source pole, and selectively closing a second switch to couple the second load pole to the source pole.

Another embodiment relates to ring bus topology that includes a first automatic transfer switch and a second automatic transfer switch. The first automatic transfer switch includes a first source pole structured to receive power from a first power source, a first load pole structured to provide power to a first load, a second load pole structured to provide power to a second load, a first switch movable between an open position isolating the first load pole from the first source pole and a closed position connecting the first load pole to the first source pole, and a second switch movable between an open position isolating the second load pole from the first source pole and a closed position connecting the second load pole to the first source pole. The second automatic transfer switch includes a second source pole structured to receive power from a second power source, a third load pole structured to provide power to the second load, a fourth load pole structured to provide power to the first load, a third switch movable between an open position isolating the third load pole from the second source pole and a closed position connecting the third load pole to the second source pole, and a fourth switch movable between an open position isolating the fourth load pole from the second source pole and a closed position connecting the fourth load pole to the second source pole. The second load pole is coupled to the third load pole, and the first load pole is coupled to the fourth load pole.

Another embodiment relates to a ring bus topology that includes a plurality of reverse flow automatic transfer switches, each including a source pole, a first load pole, a second load pole, a first switch selectively coupling the first load pole to the source pole, and a second switch selectively coupling the second load pole to the source pole. Each source pole is structured to couple to one of a plurality of power sources. Each first load pole is connected to the second load pole of an adjacent reverse flow automatic transfer switch. The first and second load poles are structured to couple to a plurality of loads.

Another embodiment relates to an automatic transfer switch that includes a source pole coupled with a power source, a first load pole coupled with a first load, a second load pole coupled with a second load, a first switch selectively coupling the first load pole to the source pole, and a second switch selectively coupling the second load pole to the source pole.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, in one embodiment, an automatic transfer switch can be used tin a reverse flow configuration to connect a power source (e.g., a generator set) to multiple loads. In some embodiments, a single generator set can be connected to two separate loads and power transmission can be selectively controlled by the automatic transfer switch. In some embodiments, multiple automatic transfer switches can be arranged in a ring bus to provide power switching and isolation capabilities for interconnecting multiple power sources and multiple loads. Additionally, power systems including automatic transfer switches can be connected via a communications network for fault detection and isolation using the automatic transfer switches.

Figure 1:
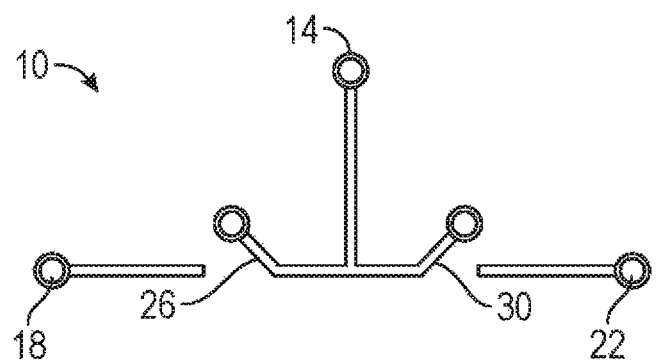
FIG. 1 is a schematic representation of a reverse flow automatic transfer switch according to some embodiments.

As shown in FIG. 1, an automatic transfer switch (ATS) 10 is arranged in a reverse flow arrangement and includes a first pole in the form of a source pole 14 that is structured to receive power from a first power source (e.g., a generator set, a solar array, a wind turbine, a battery, grid power, etc.), a second pole in the form of a first load pole 18 structured to selectively provide power to a first load or a first load bus, and a third pole in the form of a second load pole 22 structured to selectively provide power to a second load or a second load bus.

In typical forward flow installations, automatic transfer switches are connected differently than the reverse flow ATS 10 of FIG. 1. In a typical installation, an automatic transfer switch is used to couple two power sources (e.g., a grid power source and a backup such as a generator set) to a single load. When a single power source is to be coupled to multiple loads, a circuit is typically provided that includes two or more separate circuit breakers that are manually operated or automatically operated and controlled by a programmable logic controller. Alternately, a power distribution load panel with manual circuit breakers for each sub-circuit is provided. The reverse flow ATS 10 of FIG. 1 replaces the circuit breakers or load panel that couple sources to loads in typical installations and can be interconnected to a larger communications network more easily.

A first switch 26 is positioned between the source pole 14 and the first load pole 18, and a second switch 30 is positioned between the source pole 14 and the second load pole 22. The first switch 26 is controllable between an open position where a flow of electrical energy between the source pole 14 and the first load pole 18 is inhibited and a closed position where electrical communication is provided between the source pole 14 and the first load pole 18. The second switch 30 is controllable between an open position where a flow of electrical energy between the source pole 14 and the second load pole 22 is inhibited and a closed position where electrical communication is provided between the source pole 14 and the second load pole 22.

In operation, the source pole 14 is connected to a power source such as a generator set and is arranged to receive electrical power. The first load pole 18 is connected to a first electrical load and the first load is selectively powered by the power source when the first switch 26 is in the closed position. The second load pole 22 is connected to a second electrical load and the second load is selectively powered by the power source when the second switch 30 is in the closed position. In some embodiments, both the first switch 26 and the second switch 30 can be arranged in the open position simultaneously. In some embodiments, both the first switch 26 and the second switch 30 can be arranged in the closed position to power both the first load and the second load simultaneously. One example of an automatic transfer switch can be found in U.S. Patent Publication No. 2018/0190441, the entire contents of which are incorporated herein by reference.

Figure 2:
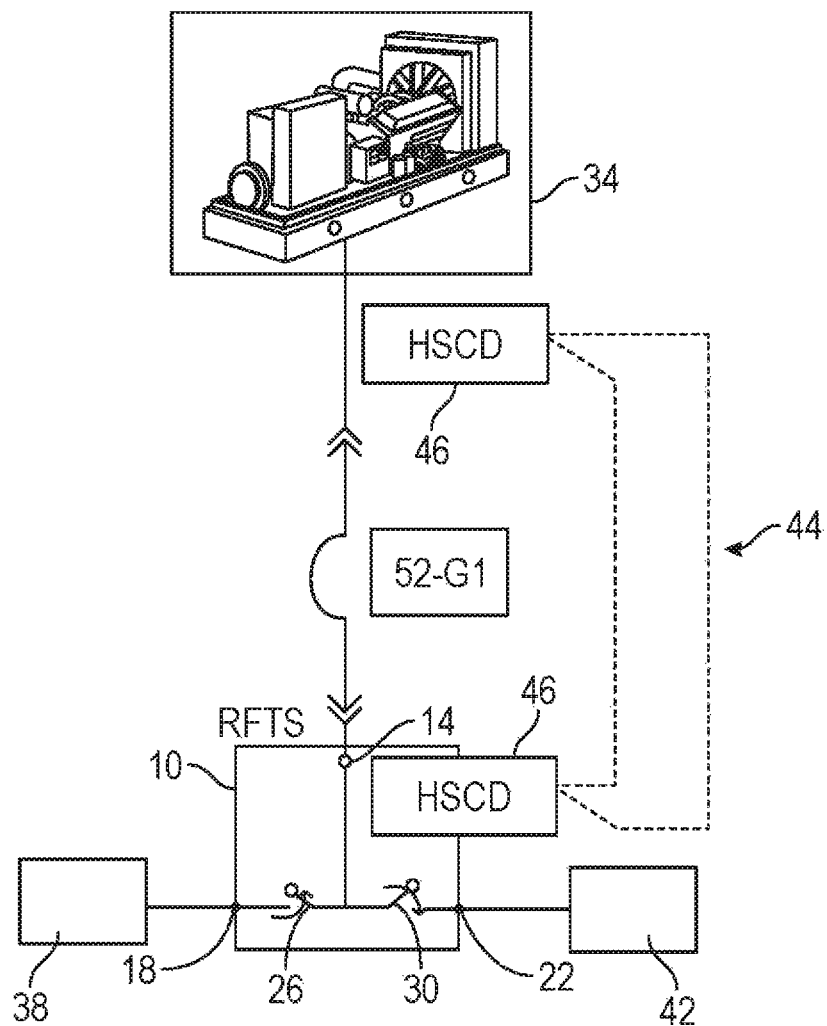
FIG. 2 is a schematic diagram of a single generator set connected to multiple loads via the reverse flow automatic transfer switch of FIG. 1 according to some embodiments.

As shown in FIG. 2, the ATS 10 can be coupled to a power source in the form of a generator set 34, a first load 38, and a second load 42. The ATS 10 is shown with the first switch 26 in the open position so that the first load 38 is not receiving power and the second switch 30 closed so that the second load 42 is powered by the generator set 34.

In some embodiments, the ATS 10 can be connected to a communications network 44 (e.g., a NEXSYS™ communication system) including controllers 46 in communication with the generator set 34 and the ATS 10. The controllers 46 are structured to receive operational parameters or characteristics from the power source (e.g., the generator set 34) and/or the loads 38, 42 and control operation of the ATS 10. In some embodiments, the controller 46 associated with the ATS 10 controls operation of the first switch 26 and the second switch 30 to direct the flow of power from the source pole 14. In some embodiments, the communications network 44 is a high speed peer-to-peer network that provides communication and power monitoring of power sources, loads, and power busses to provide a reliable architecture for fault detection, isolation, and control.

In a multi-load application like that shown in FIG. 2, a single generator set 34 can provide power to two loads 38, 42 simultaneously. Should an overload condition occur, the generator set 34 can communicate over the communications network 44 to the ATS 10 to shed a lowest priority load as determined by the controllers 46. It is noted that additional ATS switches can be coupled in reverse flow configuration to the load poles 18, 22 in place of one or more of the loads 38, 42 to provide for additional output load poles and control. In this each additional reverse flow ATS adds an additional load pole (i.e., N total reverse flow ATS switches provide N+1 load poles, while each additional "layer" of ATS switches descending from the initial reverse flow ATS 10 doubles the number of available output load poles).

Figure 3:
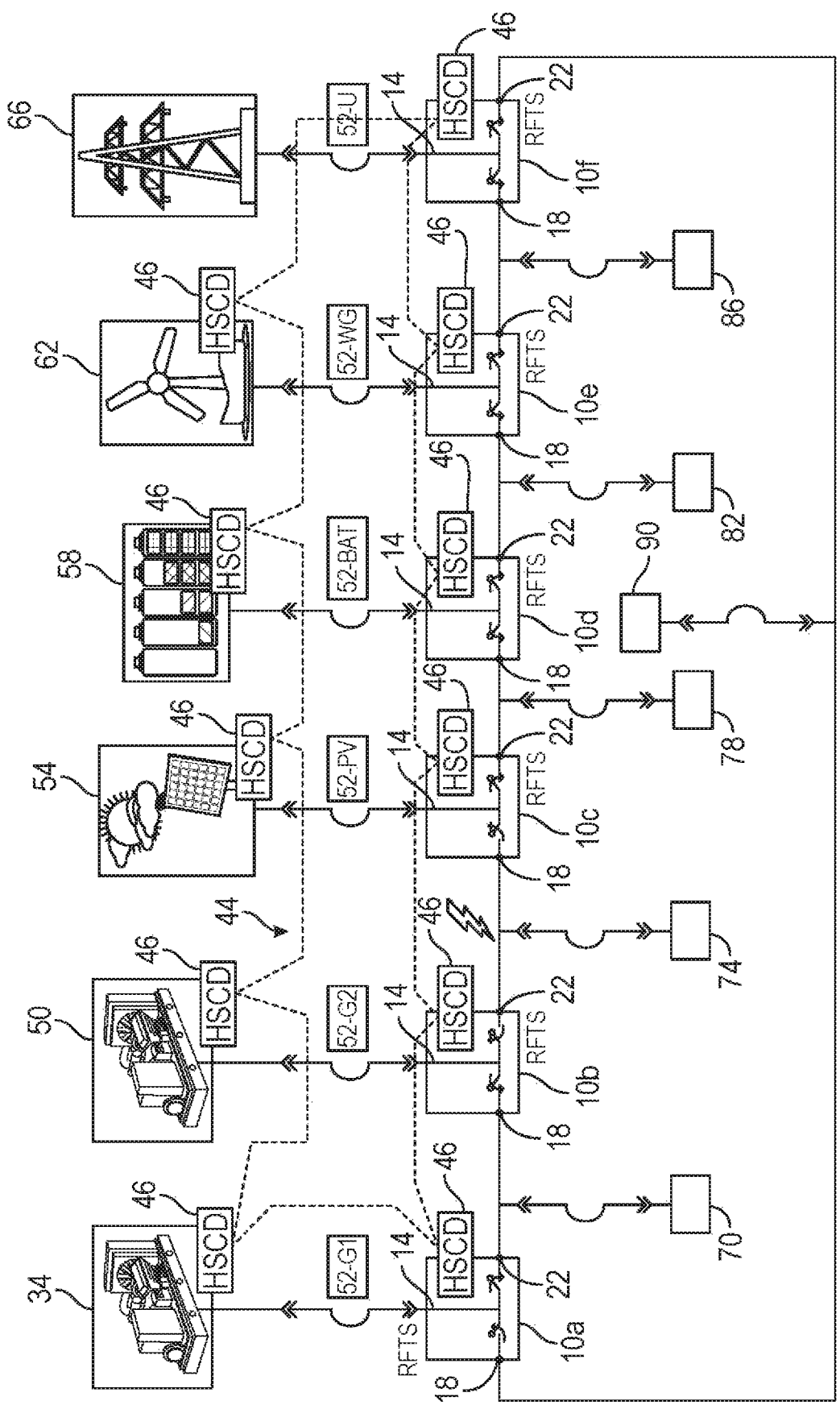
FIG. 3 is a schematic diagram of a ring bus topology including six power sources connected to six loads using six reverse flow automatic transfer switches of FIG. 1, according to some embodiments.

As shown in FIG. 3, the ATS 10 is structured for extended parallel applications such that both the first switch 26 and the second switch 30 can be arranged in the closed position simultaneously for an indefinite amount of time to allow for bus coupling applications. In some embodiments, the ATS 10 is suitable for a ring bus topology 48. The illustrated ring bus topology 48 includes six reverse flow ATS's 10*a*-10*f*. In some embodiments, a ring bus topology can include more than six ATS's 10 or less than six ATS's 10. In the ring bus topology 48, each ATS 10 replaces two circuit breakers that would typically be used in a ring bus topology. The reduction in components provided by the reverse flow ATS's 10 allows for a reduction in space claim allowing the system to be used in a smaller space. Additionally, the ATS 10 reduces the complexity of the system and the cost of the system. In some embodiments, the cost of one ATS 10 is between about one-half and about one-third the cost of two installed circuit breakers. Additionally, the circuit breakers are typically used with a programmable logic controller which adds significantly to the cost of the system.

The ring bus topology 48 includes a first power source in the form of the first generator set 34 connected to the first ATS 10*a*, a second power source in the form of a second generator set 50 connected to a second ATS 10*b*, a third power source in the form of a solar array 54 connected to a third ATS 10*c*, a fourth power source in the form of a battery bank 58 connected to a fourth ATS 10*d*, a fifth power source in the form of a wind turbine 62 connected to a fifth ATS 10*e*, and a sixth power source in the form of a power grid 66 connected to a sixth ATS 10*f*. The ring bus topology 48 also includes a first load 70 connected between the first ATS 10*a* and the second ATS 10*b*, a second load 74 connected between the second ATS 10*b* and the third ATS 10*c*, a third load 78 connected between the third ATS 10*c* and the fourth ATS 10*d*, a fourth load 82 connected between the fourth ATS 10*d* and the fifth ATS 10*e*, a fifth load 86 connected between the fifth ATS 10*e* and the sixth ATS 10*f*, and a sixth load 90 connected between the sixth ATS 10*f* and the first ATS 10*a*. The controllers 46 provide communication between the power sources 34, 50, 54, 58, 62, 66, the ATS's 10*a-f*, and the loads 70, 74, 78, 82, 86, 90 via the communications network 44. It is noted that in some embodiments one or more loads 70, 74, 78, 82, 86, 90 can be coupled to the ring bus topology 48 via an ATS 10 to enable additional control and isolation capability.

The communications network 44 allows the ring bus topology 48 to reliably detect faults in system components, isolate individual or multiple components, and/or control for power ring self-healing. For example, in FIG. 3, the controllers 46 have determined a fault in the second load 74. In response, the controllers 46 actuate the second switch 30 of the second ATS 10*b* and the first switch 26 of the third ATS 10*c* so that the second load 74 is isolated and can be serviced. It is noted that the ATS's 10*a-f* also allow the power sources 34, 50, 54, 58, 62, 66, to be isolated for service or in response to fault conditions.

The use of reverse flow ATS's 10 provides scalable opportunities from single generator set applications, to complex multi-source ring bus applications. The integration of the ATS 10 with the high speed peer-to-peer communication network architecture and power monitoring provides a self-healing communications network and power bus with granularity in fault isolation for a low cost, reliable power generation system.

In one configuration, the controllers 46 are embodied as machine or computer-readable media that is executable by a processor. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the controllers are embodied as hardware units, such as electronic control units. As such, the controllers 46 may be embodied as one or more circuitry components including, but not limited to, processing circuitry, network interfaces, peripheral devices, input devices, output devices, sensors, etc. In some embodiments, the controllers 46 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the controllers 46 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The controllers 46 may also include programmable hardware devices such as field programmable gate arrays, programmable array logic, programmable logic devices or the like. The controllers 46 may include one or more memory devices for storing instructions that are executable by the processor(s) of the controllers 46. In some hardware unit configurations, the controllers 46 may be geographically dispersed throughout separate locations. Alternatively, the controllers 46 may be embodied in or within a single unit/housing.

In the example shown, the controllers include a processing circuit having a processor and a memory device. The processing circuit may be structured or configured to execute or implement the instructions, commands, and/or control processes described herein with respect to controllers 46. The depicted configuration represents the controllers 46 as machine or computer-readable media. However, as mentioned above, this illustration is not meant to be limiting as the present disclosure contemplates other embodiments where the controllers 46, or at least one circuit of the controllers 46, is configured as a hardware unit. All such combinations and variations are intended to fall within the scope of the present disclosure.

The processor may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., controllers 46 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device (e.g., RAM, ROM, Flash Memory, hard disk storage, etc.) may store data and/or computer code for facilitating the various processes described herein. The memory device may be communicably connected to the processor to provide computer code or instructions to the processor for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein.

As mentioned above and in one configuration, the "circuits" may be implemented in machine-readable medium for execution by various types of processors, such as controllers 46 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

No claim element herein is to be construed under the provisions of 35 U.S.C. § 112(f), unless the element is expressly recited using the phrase "means for."

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the ATS 10 and other systems as shown in the various exemplary embodiments is illustrative only. Additionally, any element disclosed in one embodiment may be incorporated or utilized with any other embodiment disclosed herein.

What is claimed is:

1. A method comprising:
 coupling a first source pole of a first reverse flow automatic transfer switch with a first power source;

coupling a first load pole with a first load;
coupling a second load pole with a second load;
selectively closing a first switch to couple the first load pole to the first source pole;
selectively closing a second switch to couple the second load pole to the first source pole;
coupling a second source pole of a second reverse flow automatic transfer switch with a second power source;
coupling a third load pole with the second load;
coupling a fourth load pole with the first load;
selectively closing a third switch to couple the third load pole to the second source pole;
selectively closing a fourth switch to couple the fourth load pole to the second source pole; and
coupling the second load pole and the third load pole, and the first load pole and the fourth load pole to provide a ring bus topology.

2. The method of claim 1, further comprising communicating via a controller with the first power source, the first load, and the second load; and
determining a fault in one of the first power source, the first load, and the second load.

3. The method of claim 2, further comprising controlling actuation, via the controller, of the first switch and the second switch in response to operational characteristics of at least one of the first power source, the first load, and the second load.

4. The method of claim 2, further comprising controlling actuation, via the controller, of the first switch to a closed position providing power to the first load and controlling actuation of the second switch to a closed position providing power to the second load simultaneously.

5. The method of claim 2, further comprising determining, via the controller, an overload condition has occurred with the first power source;
determining a lowest priority load from the first load and the second load; and controlling actuation, via the controller, to an open position of the switch associated with the lowest priority load so that power is not provided to the lowest priority load.

6. The method of claim 1, further comprising closing both the first switch and the second switch to provide power to the first load and the second load simultaneously.

7. A ring bus topology, comprising:
a first automatic transfer switch positioned between a first load and a second load, and including
a first source pole structured to receive power from a first power source,
a first load pole structured to be coupled to the first load,
a second load pole structured to be coupled to the second load,
a first switch movable between an open position isolating the first load pole from the first source pole and a closed position connecting the first load pole to the first source pole, and
a second switch movable between an open position isolating the second load pole from the first source pole and a closed position connecting the second load pole to the first source pole; and
a second automatic transfer switch physically separate from the first automatic transfer switch and positioned between the second load and the first load, and including
a second source pole structured to receive power from a second power source,
a third load pole structured to be coupled to the second load,
a fourth load pole structured to be coupled to the first load,
a third switch movable between an open position isolating the third load pole from the second source pole and a closed position connecting the third load pole to the second source pole, and
a fourth switch movable between an open position isolating the fourth load pole from the second source pole and a closed position connecting the fourth load pole to the second source pole,
wherein the second load pole is coupled to the third load pole, and the first load pole is coupled to the fourth load pole.

8. The ring bus topology of claim 7, wherein the first switch, the second switch, the third switch, and the fourth switch are all arranged in the closed position to provide simultaneous power to the first load and the second load.

9. The ring bus topology of claim 7, further comprising a control system providing communication between the first automatic transfer switch and the second automatic transfer switch.

10. The ring bus topology of claim 9, wherein the control system is structured to determine a fault in the first load, and in response to determining the fault actuate the first switch and the fourth switch to the open position to isolate the first load.

11. The ring bus topology of claim 9, wherein the control system is structured to determine an overload condition has occurred and identify the first load as a lowest priority load, and
wherein the control system controls actuation of the first switch and the fourth switch to isolate the first load.

12. The ring bus topology of claim 9, wherein the control system includes a first controller associated with the first power source, a second controller associated with the first automatic transfer switch, a third controller associated with the second power source, and a fourth controller associated with the second automatic transfer switch.

13. The ring bus topology of claim 9, wherein the control system includes a high-speed peer-to-peer network.

14. A ring bus topology, comprising:
a plurality of reverse flow automatic transfer switches, each including
a source pole,
a first load pole,
a second load pole,
a first switch selectively coupling the first load pole to the source pole, and
a second switch selectively coupling the second load pole to the source pole,
wherein each source pole is structured to couple to one of a plurality of power sources,
wherein the each first load pole is connected to the second load pole of an adjacent reverse flow automatic transfer switch, and
wherein the first and second load poles are structured to couple to a plurality of loads.

15. The ring bus topology of claim 14, wherein the plurality of first switches and second switches are structured to be maintained in a closed position providing power to the plurality of loads simultaneously.

16. The ring bus topology of claim 14, wherein the plurality of reverse flow automatic transfer switches include six reverse flow automatic transfer switches.

17. The ring bus topology of claim 14, further comprising a control system providing communication between the plurality of reverse flow automatic transfer switches.

18. The ring bus topology of claim 17, wherein the control system is structured to determine a fault in one of the loads, and in response to determining the fault actuate the first switch and the second switch that are adjacent to the fault to isolate the first load.

19. The ring bus topology of claim 17, wherein the control system includes a high-speed peer-to-peer network.

* * * * *